Feb. 2, 1943.   K. R. HERMAN   2,310,078
PUMP OR MOTOR FOR POWER TRANSMISSION
Filed Dec. 24, 1938
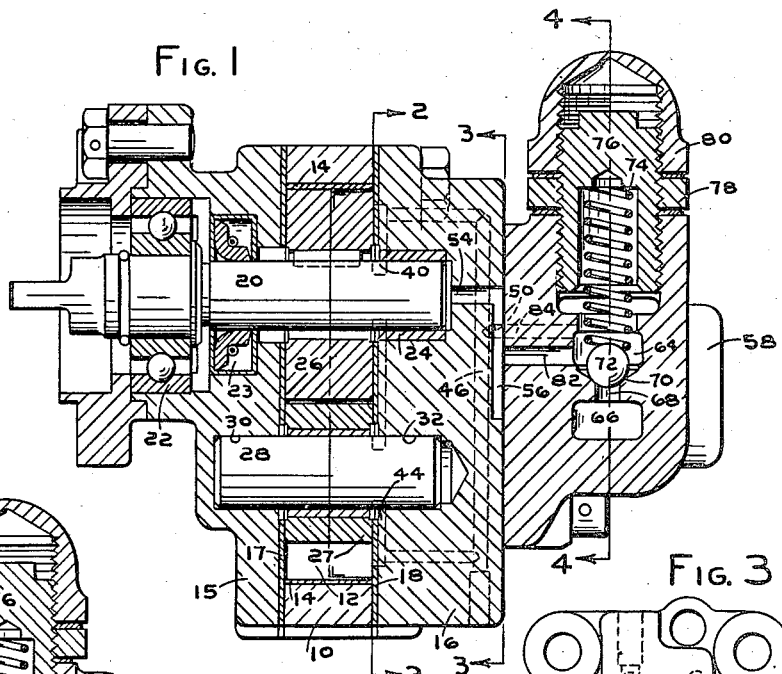
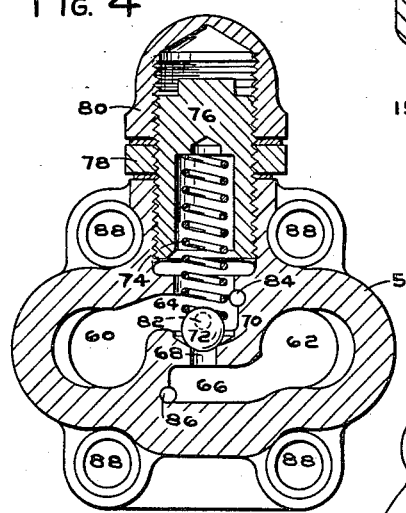
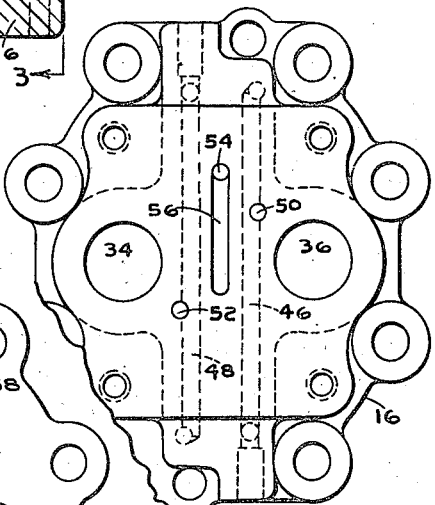
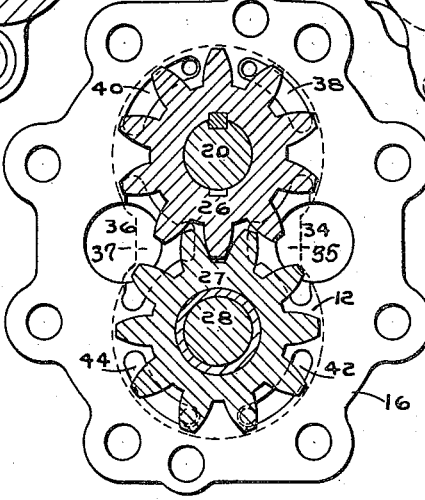
INVENTOR
KENNETH R. HERMAN
BY
*Ralph L. Tweedale*
ATTORNEY Patented Feb. 2, 1943

2,310,078

UNITED STATES PATENT OFFICE 2,310,078

PUMP OR MOTOR FOR POWER TRANSMISSION

Kenneth R. Herman, Detroit, Mich., assignor to Vickers Incorporated, Detroit, Mich., a corporation of Michigan Application December 24, 1938, Serial No. 247,579

2 Claims. (Cl. 103—126)

This invention relates to power transmissions, particularly to those of the type comprising two or more fluid pressure energy translating devices one of which may function as a pump and another as a fluid motor.

The invention is particularly concerned with a fluid pressure energy translating device operable as a pump or a motor and which is particularly adapted for use in fluid power transmission systems aboard aircraft. As is well known, devices for such service are required to be of maximum lightness and reliability.

It is an object of the present invention to provide an improved gear pump or motor having provision for balancing radially acting pressure forces and to arrange for ready rearrangement of the parts of the pump to permit of reversal of shaft rotation.

Further objects and advantages of the present invention will be apparent from the following description, reference being had to the accompanying drawing wherein a preferred form of the present invention is clearly shown.

In the drawing:

Fig. 1 is a longitudinal cross section of a gear pump or motor incorporating a preferred form of the present invention.

Figure 2 is a section on line 2—2 of Figure 1.
Figure 3 is a section on line 3—3 of Figure 1.
Figure 4 is a section on line 4—4 of Figure 1.

Referring now to Figure 1, there is provided a pump body member 10 having a gear receiving chamber 12, the shape of which is shown by dotted lines in Figure 2. The gear chamber is provided with liners 14 rigidly secured to the body 10. End plates 15 and 16 are removably secured to the faces of the body 10 and have rigidly secured thereto facings 17 and 18 which complete the lining of the gear chamber 12.

A drive shaft 20 is journalled on an antifriction bearing 22 provided with an oil seal 23 in the end plate 15 and at its right-hand end is journalled in a bearing 24 in the end plate 16. Keyed to the shaft 20 is a drive gear 26 which lies within one-half of the gear chamber 12. Meshing with the gear 26 is an idler gear 27 journalled on a fixed shaft 28 positioned in bores 30 and 32 in the end plates 15 and 16 respectively.

Referring to Figures 2 and 3, the end plate 16 is provided with suction and delivery passages 34 and 36 which connect to the spaces 35 and 37 in the gear chamber on the opposite sides of the meshing point of the two gears. These spaces may be termed suction and delivery ports.

Diametrically opposite these chambers there are provided in the facing 18 of the end plate 16 four balancing ports 38, 40, 42, and 44 of equal angular extent to the suction and delivery ports. The balancing chambers 40 and 44 are connected by a drilled conduit 46 while the chambers 38 and 42 are connected by a drilled conduit 48. As seen in Figure 3, the conduits 46 and 48 communicate with the right end face of the plate 16 by drilled passages 50 and 52. The latter are disposed non-symmetrically about a plane passing through the axes of the suction and delivery passages 34 and 36. A bore 54 is also formed in the end plate 16 connecting with the bearing 24 and forming a drain passage for oil seepage. This bore communicates with a milled groove 56 in the right end face of the plate 16.

Secured to the end plate 16 is an end cap 58 having incorporated therein a relief valve. The cap 58 has through conduits 60 and 62 which connect with the passages 34 and 36 respectively and provide at the right-hand end a means for connecting the device as a whole to suction and delivery piping.

The conduit 60 has a branch extension 64 and the conduit 62 has a branch extension 66 both of which are connected by a vertical passage 68 having a seat 70 at its upper end. A relief valve ball 72 rests on the seat 70 and is urged downwardly by a spring 74 the upper end of which is received in an adjusting screw 76 threaded into the end cap 58. Suitable lock and sealing nuts 78 and 80 are provided on the screw 76.

The extension 64 communicates with the slot 56 by a drilled connection 82. The extension 64 also communicates with the passage 50 by a drilled conduit 84 while the extension 66 communicates with the passage 52 by a drilled conduit 86.

The end cap 58 is provided with four bolt holes 88 which are symmetrically positioned about a central point just below the ball 72 and lying in the axis of symmetry of the conduits 60 and 62. It will be seen that the end cap 58 may be mounted on the end plate 16 either in the position shown or in a position 180 degrees away from that shown. In either position the conduit 82 will register with the slot 56 since, as seen in Figure 3, the latter extends below the central point above mentioned. In the position opposite to that shown, however, the register between conduits 84 and 86 on the one hand and passages 50 and 52 on the other hand will be transposed.

In constructing a device of this character for operation under pressures beyond one thousand pounds per square inch, the materials of which the various parts are made are largely determinative of success or failure. It is necessary that the clearances both at the tips of the gear teeth with the peripheral walls of the chamber and at the end faces of the gear teeth with the end walls of the chamber be maintained within extremely close limits over a wide range of temperature changes.

For purposes of lightness it is desirable to make the body member 10 and the end plates 15 and 16 of cast steel which gives requisite strength with the relatively thin wall sections illustrated. It is likewise essential that the gears be made of hardened steel in order to withstand the heavy loads imposed on them. It is undesirable, however, to run steel against steel in any bearing surface so that the provision of a lining for the gear chamber formed from a suitable bearing material is necessary. All commercially available bearing materials, however, have a markedly greater coefficient of thermal expansion than that of steel which ordinarily would prevent the use of such a liner in a steel body or at least would, if used, seriously impair the operation of the device over a wide range of operating temperatures.

This difficulty is overcome in the present invention by forming the linings 14, 17 and 18 as a relatively thin coating of the order of one-sixteenth of an inch which is intimately secured to its respective backing member along all parts of the abutting surfaces. Preferably the lining is formed by application of the bronze material in small "gobs" by a welding process until the entire surface of the steel member is covered with a built-up layer of bronze. The bronze may then be machined down to a smooth surface of required thinness. In this way it is assured that even though the coefficiency of expansion of the bronze is greater than that of the steel, the bronze layer is so thin and so intimately associated with the steel that it is prevented from following its own characteristics but can only expand or contract in the same degree that the steel does.

While the form of embodiment of the invention, as herein disclosed, constitutes a preferred form, it is to be understood that other forms might be adopted, all coming within the scope of the claims which follow.

What is claimed is as follows:

1. A gear pump or motor comprising in combination a sectional body having a gear chamber formed therein, a pair of intermeshing gears positioned in said chamber, suction and delivery ports formed in the body, a pair of balancing chambers for each gear at points diametrically opposite the suction and delivery ports respectively, a pair of conduits formed in the body each connecting one balancing chamber of each pair with one of the other pair, a pair of passages extending from the suction and delivery ports to one end face of said body, a second pair of passages extending from said conduits to said end face and spaced from the other pair of passages, an end cap member removably secured to said end face, and conduits in said cap registering with said passages and arranged to connect each passage of one pair with one passage of the other pair, said first pair of passages being positioned symmetrically about an axis lying in said end face and said other pair of passages being positioned non-symmetrically about said axis whereby the end cap may be mounted on the body in either of two angularly spaced positions without transposing the connections between the passages.

2. A gear pump or motor comprising in combination a sectional body having a gear chamber formed therein, a pair of intermeshing gears positioned in said chamber, suction and delivery ports formed in the body, a pair of balancing chambers for each gear at points diametrically opposite the suction and delivery ports respectively, a pair of conduits formed in the body each connecting one balancing chamber of each pair with one of the other pair, a pair of passages extending from the suction and delivery ports to one end face of said body, a second pair of passages extending from said conduits to said end face and spaced from the other pair of passages, an end cap member removably secured to said end face, conduits in said cap registering with said passages and arranged to connect each passage of one pair with one passage of the other pair, said first pair of passages being positioned symmetrically about an axis lying in said end face and said other pair of passages being positioned non-symmetrically about said axis whereby the end cap may be mounted on the body in either of two angularly spaced positions without transposing the connections between the passages, and a relief valve in said end cap having permanent communication with each of said conduits in the cap whereby the communication of said relief valve with said first pair of passages is transposed when the end cap is mounted in a different position.

KENNETH R. HERMAN.